United States Patent
Biedermann et al.

(10) Patent No.: US 6,865,606 B1
(45) Date of Patent: Mar. 8, 2005

(54) METHOD FOR CONTROLLING DATA TRANSMISSION IN A WIRELESS V.24 DATA TRANSMISSION SYSTEM OPERATING BETWEEN A DATA TERMINAL AND A DATA TRANSMISSION DEVICE FOR DATA TELECOMMUNICATION

(75) Inventors: Rolf Biedermann, Ahaus (DE); Diego Garcia Alfaro, Schenefeld (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/762,310
(22) PCT Filed: Aug. 4, 1999
(86) PCT No.: PCT/DE99/02420
§ 371 (c)(1), (2), (4) Date: Feb. 2, 2001
(87) PCT Pub. No.: WO00/10293
PCT Pub. Date: Feb. 24, 2000

(30) Foreign Application Priority Data

Dec. 8, 1998 (DE) .......................................... 198 36 608

(51) Int. Cl.[7] .......................... G06F 13/00; H04M 11/00
(52) U.S. Cl. ..................... 709/228; 370/468; 379/93.33
(58) Field of Search ................................ 709/200, 201, 709/227, 228; 379/93.01, 93.28, 93.31, 93.32, 93.33; 375/219, 220, 222, 225; 370/252, 468; 455/465

(56) References Cited

U.S. PATENT DOCUMENTS

| | | | | |
|---|---|---|---|---|
| 5,142,538 A | * | 8/1992 | Fickes et al. ................ | 714/750 |
| 5,412,650 A | * | 5/1995 | Davies ......................... | 370/347 |
| 5,818,740 A | * | 10/1998 | Agazzi ......................... | 708/313 |
| 6,122,498 A | * | 9/2000 | Sipila .......................... | 455/403 |

FOREIGN PATENT DOCUMENTS

| | | |
|---|---|---|
| DE | 195 45 767 | 6/1996 |
| DE | 297 14 588 U1 | 11/1997 |
| EP | 0 836 339 | 4/1998 |
| WO | WO 96/38991 | 12/1996 |
| WO | 97/41700 | 11/1997 |

OTHER PUBLICATIONS

ITU–T Specification V.24, Mar. 1993, pp. 1–19.
Nachrichtentechnik Elektronik 42, Jan./Feb. 1992, No. 1, Berlin, DE; U. Pilger "Struktur des DECT–Standards," pp. 23–29.

(List continued on next page.)

*Primary Examiner*—Moustafa M. Meky
(74) *Attorney, Agent, or Firm*—Bell Boyd & Lloyd LLC (57) ABSTRACT

A method for controlling data transmission in a cordless V.24 data transmission system operated between a data terminal and data communication equipment. The method controls data communication equipment for the purpose of data communication with a first data transmission device connected to the data terminal equipment via a V.24 cable and with a second data transmission device connected to the data communication equipment via a V.24 cable. The first and second data transmission devices can be connected via an air interface by wireless telecommunication. Activating, reactivating and deactivating of an auto-bauding function is reliably performed in such a manner that there is no risk that user data transmission is corrupted until it is deactivated. A state machine contained in the first data transmission device tracks the states of the data communication equipment and acts on the state of the auto-bauding function in the first data transmission device. In the alternative, a state machine contained in the second data transmission device tracks the states of the data communication equipment and acts on the state of the auto-bauding function in the first data transmission device.

8 Claims, 4 Drawing Sheets

OTHER PUBLICATIONS

ETSI—Publication, Oct. 1992, ETS 300175 1 . . . 9, Part 1: Overview, pp. 1–30; Part 2: Physical layer, pp. 1–39; Part 3: Medium access control layer, pp. 1–197; Part 4: Data link control layer, pp. 1–128; Part 5: Network layer, pp. 1–241; Part 6: Identities and addressing, pp. 1–41; Part 7: Security features, pp. 1–104; Part 8: Speech coding and transmission, pp. 1–39; Part 9: Public access profile, pp. 1–71.

DECT—Publikation des DECT—Forums, Feb. 1997, pp. 1–16.

Informatik Spektrum 14, Jun. 1991, No. 3, Berlin, A. Mann, "Der GSM–Standard—Grundlage für digitale europlische Mobilfunknetze", pp. 137–152.

Telekom praxis Apr. 1993, P. Smolka "GSM—Funkschnittstelle—Elemente und Funktionen", pp. 17–24.

Funkschau 6/98: R. Sietmann Ringen um die UMTS–Schnittstelle, pp. 76–81.

IEEE Communications Magazine, Jan. 1995, pp. 50–57, Falconer et al, Time Division Multiple Access Methods for Wireless Personal Communications.

Publikation Vortrag von A. Elberse, et al., "DECT Data Services—DECT in Fixed and Mobile Networks", 1996, Hotel Sofitel, Paris, pp. 1–12, und Zusammenfassung.

Components 31 (1993) Heft 6, S. Althammer et al., "Hochoptimierte IC's fur DECT Schnurlostelefone", pp. 215–218.

* cited by examiner

METHOD FOR CONTROLLING DATA TRANSMISSION IN A WIRELESS V.24 DATA TRANSMISSION SYSTEM OPERATING BETWEEN A DATA TERMINAL AND A DATA TRANSMISSION DEVICE FOR DATA TELECOMMUNICATION

BACKGROUND OF THE INVENTION

1. Field of the Invention

The present invention generally pertains to cordless data transmission systems. In particular, the present invention pertains to data transmission in cordless data transmission systems.

2. Discussion of the Related Art

Data telecommunication (datel) is the mutual sending and receiving of data or data signals, such as packet data, between a data terminal equipment and a remote data terminal equipment via a telecommunication network, for example a public telecommunication network, such as ISDN, PSTN, etc. The term data terminal equipment refers to personal computers, data terminals, DP systems etc. The term remote data terminal equipment refers to personal computers, data terminals, DP systems etc. So that the data or data signals sent by the data terminal equipment can be transmitted via the telecommunication network, a network facility, so-called data communication equipment, is provided between the data terminal equipment and the telecommunication network. Apart from the PC card, previously known as a PCMCIA card, the most widely used data communication equipment is the modem.

The modem is an electrical data communication equipment operating on the basis of the carrier-current method for use on analogue transmission paths of limited bandwidth—e.g. telecommunication lines, such as a/b circuit pair, ISDN-$S_0$-BUS etc., of a telecommunication network. Modems convert and transmit digital data signals into analogue data signals and vice-versa. Furthermore, a multiplicity of methods of the V series standardized by the International Telecommunication Union-Telecommunication Standards (ITU-T)—are implemented in modems.

Discussion of the DECT (Digital Enhanced Cordless Telecommunications) standards is given at pages 1–12 and in the summary in Nachrichtentechnik Elektronik 42, January/February 1992, No. 1, Berlin, Del.; in U. Pilger "Struktur des DECT-Standards" ("Structure of the DECT Standard"), pages 23 to 29, in conjunction with ETSI publication ETS 300175-1 . . . 9, October 1992; the text of a lecture by A. Elberse, M. Barry and G. Fleming entitled "DECT Data Services—DECT in Fixed and Mobile Networks", on Jun. 17–18, 1996, at the Sofitel Hotel in Paris; the publication by S. Althammer and D. Brückmann entitled "Hochoptimierte IC's für DECT-Schnurlostelefone" ("Highly Optimized ICs for Cordless DECT Telephones"); and in the DECT publication of the DECT Forum, February 1997, pages 1 to 16.

Discussion of the GSM (Groupe Spéciale Mobile or Global System for Mobile Communication) standard is given in Informatik Spektrum 14, June 1991, No. 3, Berlin, Del.; in A. Mann's "Der GSM-Standard—Grundlage für digitale europäische Mobilfunknetze" ("The GSM Standard—Basis for Digital European Mobile Radio Networks"), pages 137 to 152, in conjunction with the publication Telekom Praxis April, 1993; and in P. Smolka's "GSM-Funkschnittstelle—Elemente und Funktionen" ("The GSM Radio Interface—Elements and Functions"), pages 17 to 24.

Discussion of the Universal Mobile Telecommunications System (UMTS) is given in Funkschau June 1998; in R. Sietmann "Ringen um die UMTS-Schnittstelle" ("Fighting for the UMTS Interface"), pages 76 to 81; in WACS or PACS, IS-54, IS-95, PHS, PDC etc.; IEEE Communications Magazine, January 1995, pages 50 to 57; and in D. D. Falconer, et al., "Time Division Multiple Access Methods for Wireless Personal Communications."

Additional discussion is given in the publication "Vortrag von A. Elberse, M. Barry, G. Fleming zum Thema; in the printed documents Components 31 (1993), Vol. 6, pages 215 to 218; and in WO 96/38991.

The basis of the present invention involves controlling, in a cordless V.24 data transmission system operated between a data terminal equipment and a data communication equipment for the purpose of data telecommunication, the reactivating and deactivating of an auto-bauding function in such a manner that a reliable implementation of the auto-bauding function becomes possible. According to the method of the present invention, there is no risk that the user data transmission, until it is deactivated, is corrupted by the auto-bauding function which is activated until then.

SUMMARY OF THE INVENTION

It is an object of the present invention to provide a method for controlling the reactivating and deactivating of an auto-baud function in a cordless V.24 data transmission system.

It is another object of the invention to provide a method for controlling data transmission in a cordless V.24 data transmission system such that there is no risk that user data transmission will be corrupted by an auto-bauding function.

It is a further object of the invention to provide a method for reliably implementing an auto-bauding function for data transmission in a cordless V.24 data transmission system.

DETAILED DESCRIPTION OF THE PREFERRED EMBODIMENT

Figure 1:
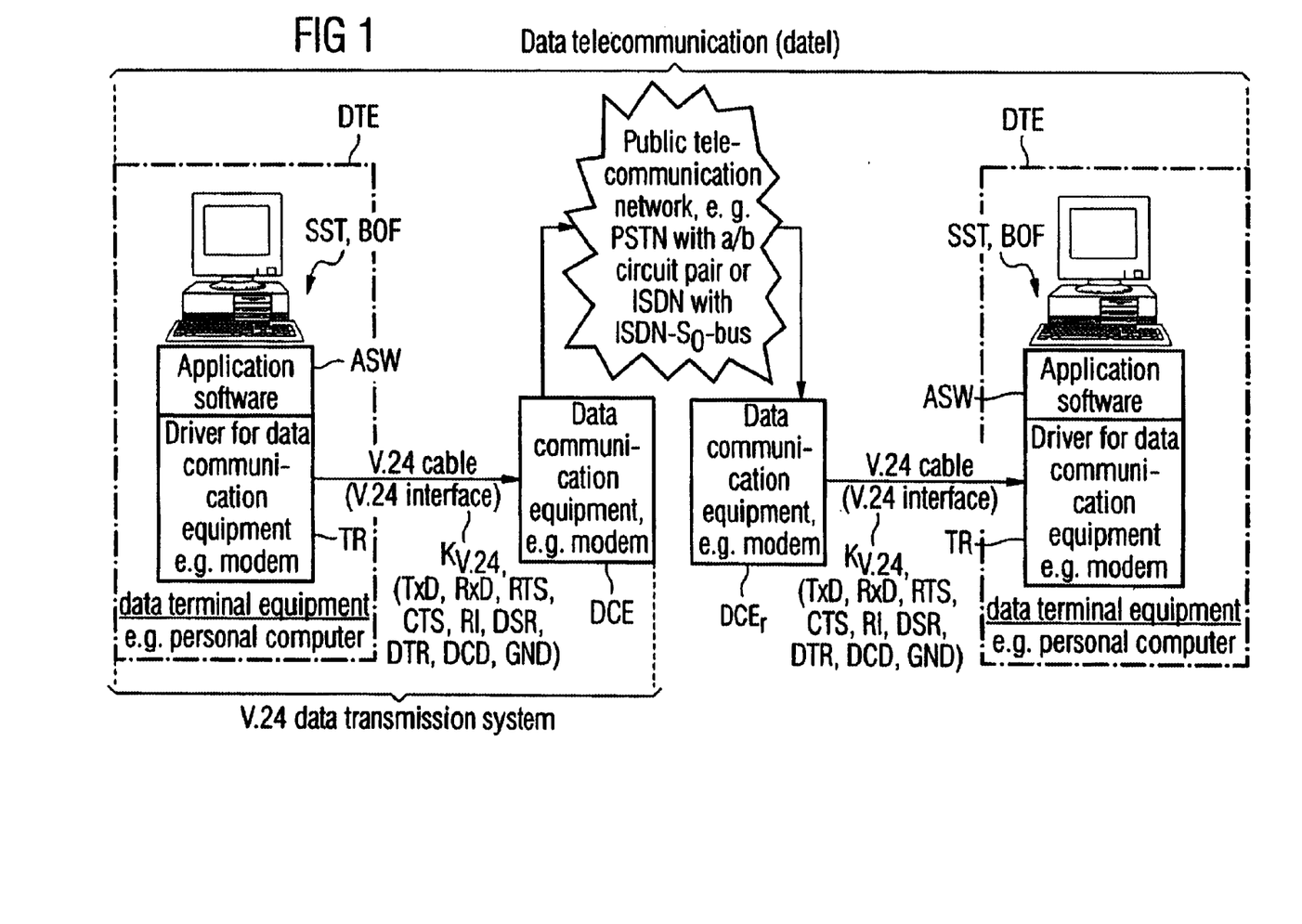
FIG. 1 shows a V.24 data telecommunication system.

Referring to FIG. 1, a V.24 data transmission system is connected to a remote V.24 data transmission system via a public telecommunication network, for example a PSTN (public switched telecommunication network) exhibiting an a/b circuit pair or an ISDN (integrated services digital network) exhibiting an ISDN $S_0$ bus. The V.24 data transmission system uses a data terminal equipment DTE constructed, such as a personal computer and a data communication equipment DCE, such as a modem, which are connected to one another via a V.24 cable (V.24 interface) $K_{V.24}$.

A remote V.24 data transmission system exhibits a remote data terminal equipment $DTE_r$ constructed, such as a personal computer and remote data communication equipment $DCE_r$ constructed, such as a modem which are also connected to one another via a V.24 cable (V.24 interface) $K_{V.24}$.

The $DTE_r$ contains a system controller SST with a use interface BOF, an application software ASW and a driver TR as interface adapter between software (application software) and hardware, namely data communication equipment or modem.

The driver TR is specific to the modem manufacturer and preferably constructed as a CAPI (common ISDN application programmable interface) driver, such as a standardized communication interface for user software for error-tolerant ISDN telecommunication with a personal computer, or as a TAPI (telephone application programmable interface) driver.

A multiplicity of the data communication equipment DCE which can be obtained on the market, such as analogue modems and ISDN terminal adapters external to the PC are controlled via a HAYES instruction set or HAYES standard. The HAYES standard was originally an American industry standard for modem communication, especially for modem control by the data terminal equipment DTE. It is also called the AT standard because almost all instructions of the HAYES instruction set begin with the prefix "AT" (Attention) comprising the ASCII characters A and T. The standard, which has been introduced throughout the world, is the subject matter of an ITU Recommendation (International Telecommunication Union) designated by "ITU-T V.25ter". Instead of the prefix "AT", the prefix "at", the prefix "A/" or the prefix a/" can also be used.

In these modems, the modem driver TR of the data terminal equipment DTE changes the baud rate at the V.24 interface depending on the data transmission phase, specifically connection set-up, negotiation of the transmission parameters etc. This change in baud rate is transmitted via the V.24 cable $K_{V.24}$ to the data communication equipment or modem, DCE, but not by means of signalling. Thus, the modem DCE must automatically detect the newly set baud rate and adapt itself to the driver TR (auto-bauding). The baud rate at which the "AT" character sequence is transmitted is valid until the next "AT" character sequence is received.

This auto-bauding is active in the modem until the modem has changed into the user data transmission mode, or the so-called "transparent mode" after a connection set-up. In this mode, a "point-to-point" connection ("end-to-end" connection) exists with the remote data communication equipment or, the remote modem $DCE_r$. Auto-bauding is then switched off so that "AT" character sequences are not interpreted in the user data stream and there is the possibly that an unwanted change in baud rate may occur at the modem.

The V.24 cable or V.24 interface $K_{V.24}$ supports modem operation on a personal computer by means of various lines, often referred to as status lines, in accordance with ITU-T Specification V.24, March 1993, pages 1–19.

These lines are a transmit data line TxD for data transmission, a receive data line RxD for data transmission, an RTS (Ready To Send) line RTS for the "hardware handshake" type of transmission for transmitting the "READY TO SEND" state ("RTS" state), a CTS (Clear To Send) line CTS for the "hardware handshake" type of transmission for transmitting the "CLEAR TO SEND" state ("CTS" state), an RI (Ring Indication) line RI for detecting ringing at the modem, a DSR (DATA SET READY) line DSR on which the modem reports to the personal computer that it is switched on, a DTR (DATA TERMINAL READY) line DTR on which the personal computer reports to the modem that it is switched on and is ready to accept calls, a DCD (DATA CHANNEL DETECTION) line DCD on which the modem reports to the personal computer that it has accepted and set up the connection to a remote modem, and a ground (GrouND) line GND.

If the V.24 cable or V.24 interface $K_{V.24}$ does not have the nine lines listed above but has fewer than nine, e.g. seven, this 7-wire cable can still support the modem operation and the personal computer. This is possible due to the fact that, instead of the "hardware handshake" on the RTS/CTS lines, a "software handshake" type of transmission is performed for transmitting the "RTS", "CTS" states—e.g. by means of an XON/XOFF protocol—on the transmit/receive data lines TxD, RxD. In the "software handshake", the data stream transmitted between the data terminal equipment DTE and the data communication equipment DCE is analyzed in the data terminal equipment DTE and the data communication equipment DCE, all "software handshake signals" are interpreted and measures are correspondingly initiated.

For an application scenario in which the data terminal equipment DTE and the data communication equipment DCE are spatially separated from one another, e.g. by several meters, the cord-connected V.24 data transmission system shown in FIG. 1 exhibits the disadvantage that a V.24 cable $K_{V.24}$, the length of which corresponds to the spatial arrangement of data terminal equipment DTE and data communication equipment DCE is required for the data telecommunication and, a large effort is expended for laying the cable for the installation of the system with such cable lengths.

Analogously to cordless telephony, it is therefore desirable and also imaginable to replace the cord-connected V.24 data transmission system according to FIG. 1 with a cordless V.24 data transmission system.

Figure 2:
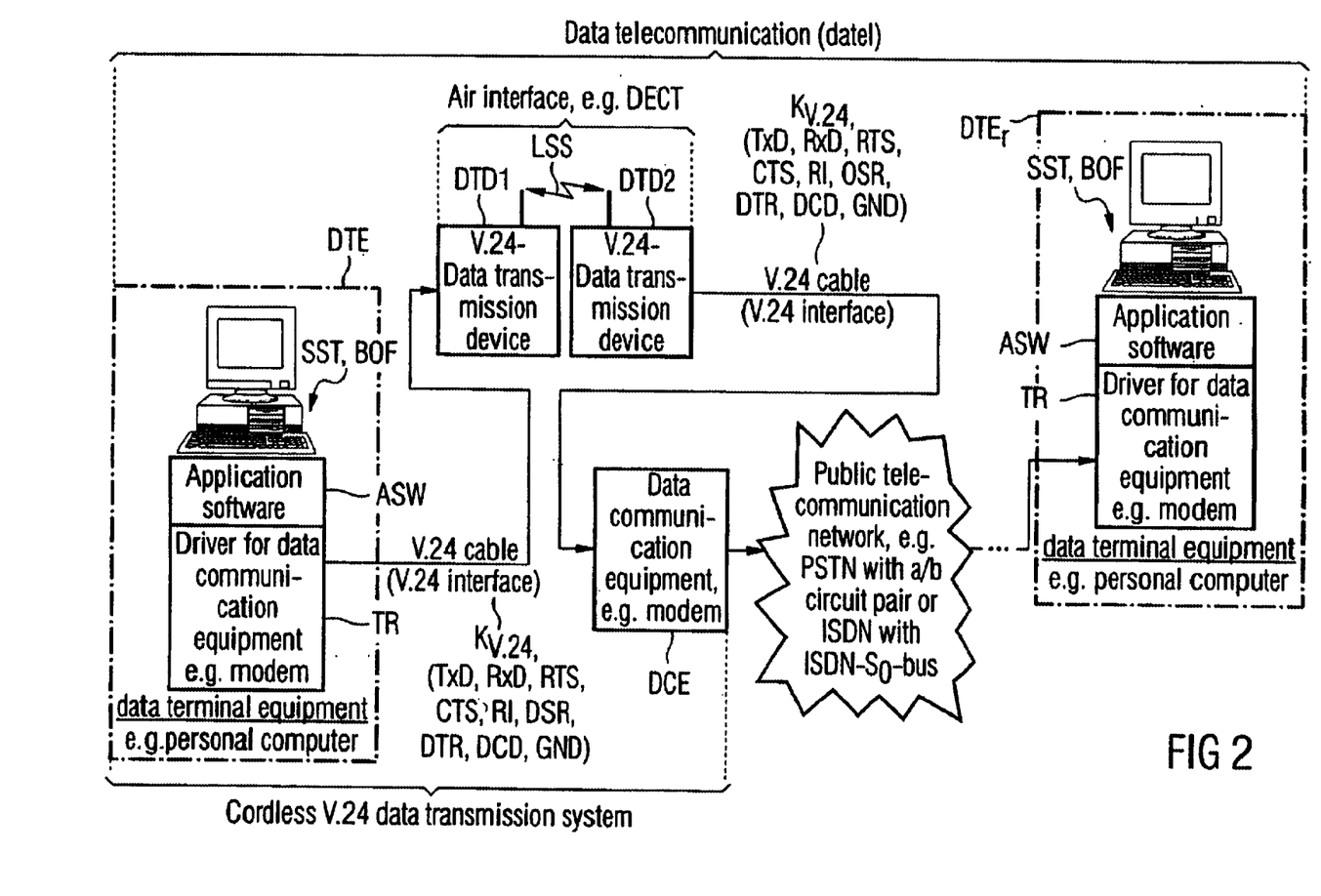
FIG. 2 shows a cordless V.24 data transmission system for data telecommunication.

Turning now to FIG. 2, which shows a cordless V.24 data transmission system for data telecommunication. A remote V.24 data transmission system (not shown) can either be cord-connected according to FIG. 1 or cordless like the cordless V.24 data transmission system in FIG. 2.

The V.24 cable or V.24 interface $K_{V.24}$ between the data terminal equipment DTE and the data communication equipment DCE are split apart in the cordless V.24 data transmission system and are connected at the two ends of the cable caused by the splitting to one data transmission device in each case.

The two data transmission devices, a first data transmission device DTD1 connected to the data terminal equipment DTE by the V.24 cable or V.24 interface $K_{V.24}$ and a second data transmission device DTD2 connected to the data communication equipment DCE by the V.24 cable or V.24 interface $K_{V.24}$, are connected to one another by an air interface LSS for wireless telecommunication.

Here interfaces are wireless telecommunication interfaces in which messages are transmitted via a remote transmission link between a message source, such as a first data transmission device DTD1 and a message sink, such as a second data transmission device DTD2 wirelessly on the basis of various message transmission methods FDMA (frequency division multiple access), TDMA (time division multiple access) and/or CDMA (code division multiple access), such as in accordance with radio standards, such as DECT.

The air interface LSS provided in FIG. 2 is preferably the DECT air interface.

DECT technology is suitable for the basic applicability of the DECT technology for the wireless mobile remote transmission of voice and/or packet data in which the user can both become his own network operator, and also have an access capability to a high-level telecommunication network due to the DECT network access technology with respect to the remote transmission of user data.

If it is intended to replace a V.24 cable link, e.g. between a personal computer and a modem, by means of a cordless data transmission link according to FIGS. 1 and 2, it is also necessary to offer the feature of "Auto-bauding" (automatic baud rate recognition at the V.24 interface) normally used in modems at the cordless data transmission link so that the modem drivers supplied with a modem can still be used. However, this auto-bauding is not always active at the modem but must be switched off in the user data transmission mode, the so-called "transparent mode" of the modem.

According to the method of the present invention, a cordless V.24 data transmission system operated between a data terminal equipment, such as a personal computer and data communication equipment, such as a modem, for the purpose of data telecommunication, with a first data transmission device connected to the data terminal equipment via a V.24 cable and with a second data transmission device connected to the data communication equipment via a V.24 cable, which is connected via an air interface by wireless telecommunication, the auto-bauding function activated in the first data transmission device and in the data communication equipment is deactivated and reactivated at the time at which the auto-bauding function would be deactivated and reactivated in the data communication equipment in a cord-connected V.24 data transmission system. A state machine contained in the first data transmission device tracks the states of the data communication equipment and acts on the state of the auto-bauding in the first data transmission device or, a state machine contained in the second data transmission device tracks the states of the data communication equipment and acts on the state of the auto-bauding in the first data transmission device.

Figure 3:
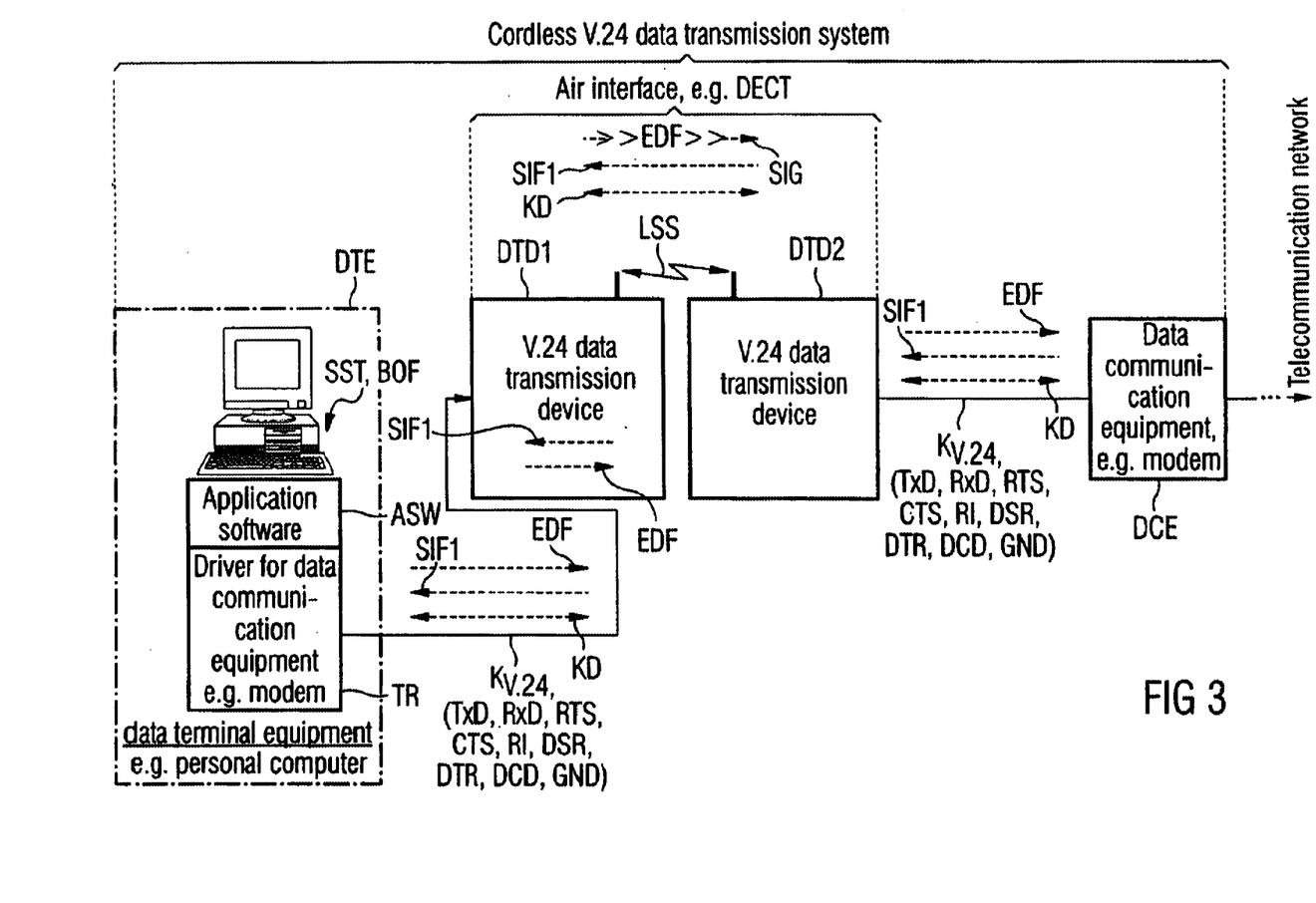
FIG. 3 shows a cordless V.24 data transmission system according to the present invention.

An embodiment of the present invention will now be explained with reference to FIG. 3, which shows a cordless V.24 data transmission system.

When the data terminal equipment DTE, the data communication equipment DCE and the V.24 data transmission devices DTD1, DTD2 are switched on, the V.24 data transmission devices DTD1, DTD2, the data terminal equipment DTE and the data communication equipment DCE are operated in an instruction data transmission mode, in which instruction data KD are transmitted between the data terminal equipment DTE and the data communication equipment DCE when the auto-bauding function is activated in the data communication equipment DCE.

The data communication equipment DCE goes into a user data transmission mode when the connection set-up to the remote data communication equipment $DCE_r$ is established.

As the data communication equipment DCE changes from the instruction data transmission mode into the user data transmission mode, the data communication equipment DCE deactivates its auto-bauding function and transmits a first special information item SIF1 to the data terminal equipment DTE to the effect that the connection set-up has taken place.

The first V.24 data transmission device DTD1 monitors the data stream transmitted from the data communication equipment DCE to the data terminal equipment DTE, changes from the instruction data transmission mode to the user data transmission mode when the first special information item SIF1 is detected, and deactivates its auto-bauding function before the data terminal equipment DTE in turn changes from the instruction data transmission mode to the user data transmission mode as it receives the first special information item SIF1 sent by the first V.24 data transmission device DTD1.

At the end of the user data transmission in the user data transmission mode, the data terminal equipment DTE transmits an ESCAPE data sequence EDF in the direction of the data communication equipment DCE and, as a consequence, changes to the instruction data transmission mode.

The first V.24 data transmission device DTD1 monitors the user data stream transmitted from the data terminal equipment DTE to the data communication equipment DCE and, when it detects the ESCAPE data sequence EDF, transmits it by means of signalling SIG to the second V.24 data transmission device DTD2, changes from the user data transmission mode to the instruction data transmission mode and reactivates its auto-bauding function.

The second V.24 data transmission device DTD2 transmits the ESCAPE data sequence EDF received from the first V.24 data transmission device DTD1 to the data communication equipment DCE.

When it detects the ESCAPE data sequence EDF, the data communication equipment DCE changes from the user data transmission mode to the instruction data transmission mode and, as a consequence, reactivates its auto-bauding function.

Figure 4:
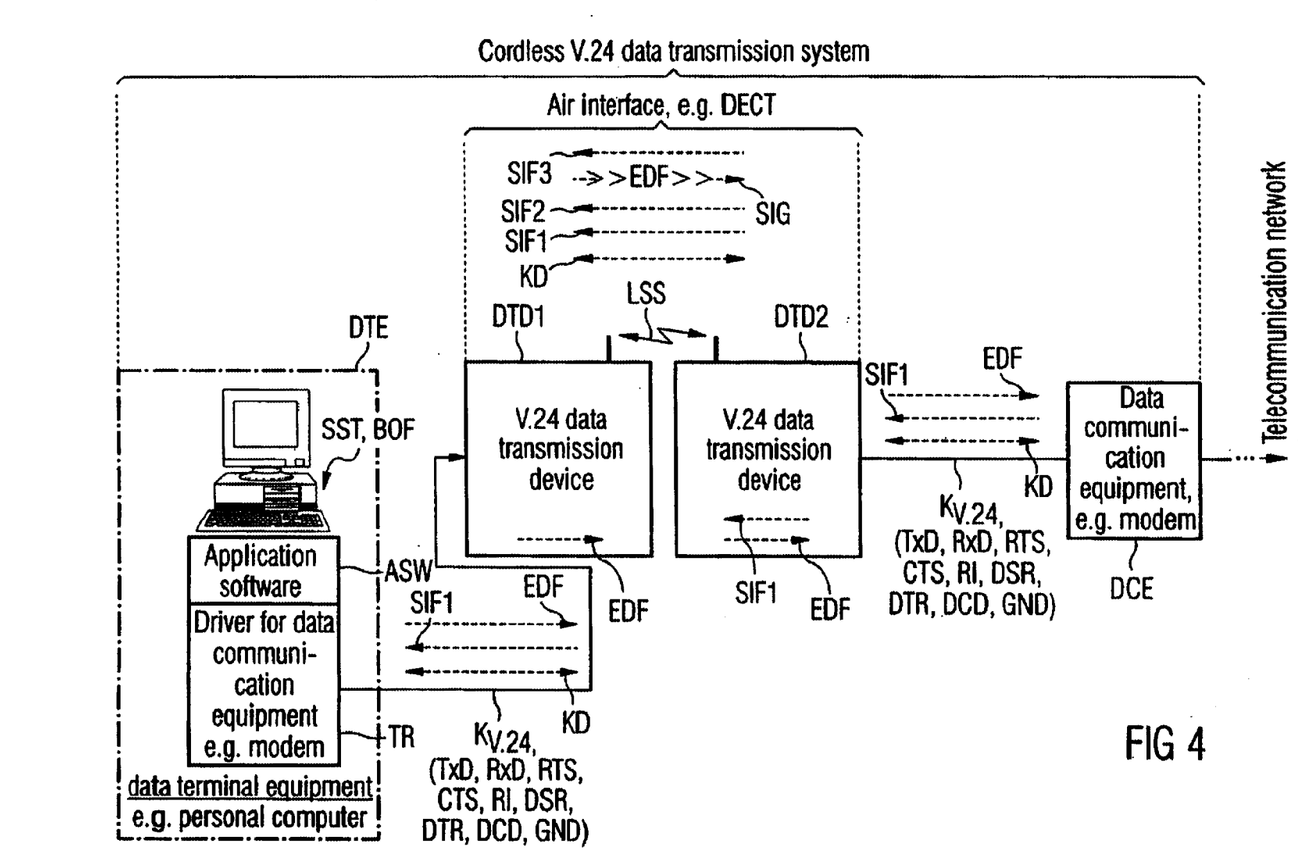
FIG. 4 shows another cordless V.24 data transmission system according to the present invention.

Another embodiment of the present invention will be explained with reference to FIG. 4, which shows a cordless V.24 data transmission system.

When the data terminal equipment DTE, the data communication equipment DCE and the V.24 data transmission devices DTD1, DTD2 are switched on, the V.24 data transmission devices DTD1, DTD2, the data terminal equipment DTE and the data communication equipment DCE are operated in an instruction data transmission mode, in which instruction data KD are transmitted between the data terminal equipment DTE and the data communication equipment DCE when the auto-bauding function is activated in the data communication equipment DCE.

The data communication equipment DCE goes into a user data transmission mode when the connection set-up to the remote data communication equipment $DCE_r$ is established.

As the data communication equipment DCE changes from the instruction data transmission mode into the user data transmission mode, the data communication equipment DCE deactivates its auto-bauding function and transmits a first special information item SIF1 to the data terminal equipment DTE to the effect that the connection set-up has taken place.

The second V.24 data transmission device DTD2 monitors the data stream transmitted from the data communication equipment DCE to the data terminal equipment DTE and, when it detects the first special information item SIF1, transmits the first special information item and a second special information item SIF2 to the first V.24 data transmission device DTD1.

When the first V.24 data transmission device DTD1 receives the second special information item SIF2, it changes from the instruction data transmission mode to the user data transmission mode and deactivates its auto-bauding function before the data terminal equipment DTE, changes from the instruction data transmission mode to the user data transmission mode as it receives the first special information item SIF1.

At the end of the user data transmission in the user data transmission mode, the data terminal equipment DTE transmits an ESCAPE data sequence EDF in the direction of the data communication equipment DCE and, as a consequence, changes to the instruction data transmission mode.

The first V.24 data transmission device DTD1 monitors the user data stream transmitted from the data terminal equipment DTE to the data communication equipment DCE and, when it detects the ESCAPE data sequence EDF, transmits it by means of signalling SIG to the second V.24 data transmission device DTD2.

When it detects the ESCAPE data sequence, the second V.24 data transmission device transmits a third special information item, namely SIF3, to the first V.24 data transmission device DTD1.

When it receives the third special information item SIF3, the first V.24 data transmission device DTD1 changes from the user data transmission mode to the instruction data transmission mode and, as a consequence, reactivates its auto-bauding function.

The second V.24 data transmission device DTD2 transmits the ESCAPE data sequence EDF received from the first V.24 data transmission device DTD1 to the data communication equipment DCE.

When it detects the ESCAPE data sequence EDF, the data communication equipment DCE changes from the user data transmission mode to the instruction data transmission mode and reactivates its auto-bauding function.

Although modifications and changes may be suggested by those skilled in the art to which this invention pertains, it is the intention of the inventors to embody within the patent warranted hereon, all changes and modifications that may be reasonably and properly come under the scope of their contribution to the art.

What is claimed is:

1. A method for controlling data transmission in a cordless V.24 data transmission system operated between data terminal equipment and data communication equipment having an auto-bauding function, the V.24 data transmission system having a first V.24 data transmission device and a second V.24 data transmission device which are connected to one another via an air interface, the first V.24 data transmission device being connected to the data terminal equipment, the second V.24 data transmission device being connected to the data communication equipment, the data communication equipment being connected to a remote data communication equipment with downstream remote data terminal equipment, the method comprising the steps of:

operating the first V.24 data transmission device, the second V.24 data transmission device, the data terminal equipment and the data communication equipment in an instruction data transmission mode when the data terminal equipment, the data communication equipment and the V.24 data transmission devices are switched on, such that instruction data is transmitted between the data terminal equipment and the data communication equipment when the auto-bauding function is activated in the data communication equipment;

operating the data communication equipment in a user data transmission mode when the connection set-up to the remote data communication equipment is established;

deactivating in the data communication equipment the auto-bauding function and transmitting a first special information item to the data terminal equipment indicating that the connection set-up has taken place when the data communication equipment changes from the instruction data transmit mode to the user data transmission mode;

monitoring in the first V.24 data transmission device, the data stream transmitted from the data communication equipment to the data terminal equipment in the first V.24 data transmission device, before changing in the first V.24 data transmission device from the instruction data transmission mode to the user data transmission mode, and deactivating in the first V.24 data transmission device the auto-bauding function before the data terminal equipment changes from the instruction data transmission mode to the user data transmission mode as the data terminal equipment receives the first special information item;

transmitting from the data terminal equipment at the end of the user data transmission in the user data transmission mode, an ESCAPE data sequence in the direction of the data communication equipment, and changing in the data terminal equipment to the instruction data transmission mode;

monitoring in the first V.24 data transmission device, the user data stream transmitted from the data terminal equipment to the data communication equipment, detecting in the first V.24 data transmission device the ESCAPE data sequence, transmitting the ESCAPE data sequence to the second V.24 data transmission device, changing in the first V.24 data transmission device from the user data transmission mode to the instruction data transmission mode, and reactivating in the data transmission equipment the auto-bauding function;

transmitting from the second V.24 data transmission device, the ESCAPE data sequence received from the first V.24 data transmission device to the data communication equipment; and changing in the data communication equipment from the user data transmission mode to the instruction data transmission mode, and reactivating in the data communication equipment the auto-bauding function when the ESCAPE data sequence is received.

2. The method as claimed in claim 1, wherein the instruction data are Hayes Standard Command Set-related instructions, including the prefix "AT (attention)".

3. The method as claimed in claim 2, further comprising the step of using a modem as the data communication equipment and a personal computer as the data terminal equipment.

4. The method as claimed in claim 3, further comprising the step of using a DECT as the air interface.

5. A method for controlling data transmission in a cordless V.24 data transmission system operated between data terminal equipment and data communication equipment for the purpose of data telecommunication, the V.24 data transmission system having a first V.24 data transmission device and a second V.24 data transmission device which are connected to one another via an air interface, the first V.24 data transmission device being connected to the data terminal equipment, the second V.24 data transmission device being connected to the data communication equipment and the data communication equipment being connected to a remote data communication equipment with downstream remote data terminal equipment, the method comprising the steps of:

operating the first V.24 data transmission device, the second V.24 data transmission device, the data terminal equipment, and the data communication equipment in an instruction data transmission mode when the data terminal equipment, the data communication equipment and the V.24 data transmission devices are switched on, such that instruction data is transmitted between the data terminal equipment and the data communication equipment when the auto-bauding function is activated in the data communication equipment;

operating the data communication equipment in a user data transmission mode when the connection set-up to the remote data communication equipment is established;

deactivating in the data communication equipment the auto-baud function and transmitting a first special information item to the data terminal equipment indicating that the connection has taken place when the data communication equipment changes from the instruction data transmission mode into the user data transmission mode;

monitoring in the second V.24 data transmission device the data stream transmitted from the data communication equipment to the data terminal equipment and, detecting in the second V.24 data transmission device the first special information item, transmitting from the second V.24 data transmission device to the first V.24 data transmission device the first special information item and a second special information item;

when it receives the second special information item, changing in the first V.24 data transmission device when the second special information item is received from the instruction data transmission mode to the user data transmission mode, and deactivating in the first V.24 data transmission device the auto-bauding function before the data terminal equipment changes from the instruction data transmission mode to the user data transmission mode as the first V.24 data transmission device receives the first special information item;

transmitting from the data terminal equipment, an ESCAPE data sequence in the direction of the data communication equipment, and changing to the instruction data transmission mode at the end of the user data transmission;

monitoring in the first V.24 data transmission device, the user data stream transmitted from the data terminal equipment to the data communication equipment, and transmitting the ESCAPE data sequence from the first V.24 data transmission device to the second V.24 data transmission device when the data terminal equipment detects the ESCAPE data sequence;

transmitting from the second V.24 data transmission device, a third special information item to the first V.24 data transmission device when the second V.24 data transmission device detects the ESCAPE data sequence;

changing in the first V.24 data transmission device, from the user data transmission mode to the instruction data transmission mode, and reactivating in the first V.24 data transmission device the auto-bauding function when the first V.24 data transmission device receives the third special information item;

transmitting from the second V.24 data transmission device, to the data communication equipment, the ESCAPE data sequence received from the first V.24 data transmission device; and changing in the data communication equipment, from the user data transmission mode to the instruction data transmission mode, and reactivating in the data communication equipment the auto-bauding function when the data communication equipment detects the ESCAPE data sequence.

6. The method as claimed in claim 5, wherein the instruction data are Hayes Standard Command Set-related instructions, including the prefix "AT (attention)".

7. The method as claimed in claim 6, further comprising the step of using a modem as the data communication equipment and a personal computer as the data terminal equipment.

8. The method as claimed in claim 7, further comprising the step of using a DECT as the air interface.

* * * * *